United States Patent [19]
Kudo

[11] Patent Number: 5,511,421
[45] Date of Patent: Apr. 30, 1996

[54] ACCELERATION SENSOR

[75] Inventor: Koichi Kudo, Kyoto, Japan

[73] Assignee: Rohm Co., Ltd., Japan

[21] Appl. No.: 88,735

[22] Filed: Jul. 8, 1993

[30] Foreign Application Priority Data

| Jul. 8, 1992 | [JP] | Japan | .................. 4-206086 |
| Oct. 15, 1992 | [JP] | Japan | .................. 4-277129 |
| Apr. 15, 1993 | [JP] | Japan | .................. 5-088425 |

[51] Int. Cl.$^6$ ................................................. G01P 15/08
[52] U.S. Cl. .................. 73/514.32; 73/514.01; 73/514.23; 73/514.35
[58] Field of Search .......... 73/516 LM, 516 R, 73/517 A, 517 B, 517 AV, 517 R, 777, 780, 782, 862.68, 862.64, 763, 767, 862.625, 862.642, 514.01, 514.15, 514.16, 514.21, 514.23, 514.24, 514.25, 514.32, 514.35; 310/329; 324/160, 162, 661, 662, 176, 457, 658, 663, 686; 361/281, 280, 283.1; 29/25.41; 307/580, 308; 200/61.45 R, 61.53, 61.58 R, 181; 257/254, 414, 415, 417–420; 318/651–652, 648, 687, 135, 568.16; 369/145

[56] References Cited

U.S. PATENT DOCUMENTS

| 4,164,263 | 8/1979 | Heintz et al. ............... 73/517 R |
| 4,378,510 | 3/1983 | Bennett ....................... 73/517 R |
| 4,430,895 | 2/1984 | Colton ........................ 73/517 R |
| 4,483,194 | 11/1984 | Rudolf ....................... 73/517 R |
| 4,736,629 | 4/1988 | Cole ........................... 73/517 R |
| 4,891,985 | 1/1990 | Glenn ......................... 73/517 R |
| 5,068,640 | 11/1991 | Burger et al. ............... 73/517 R |
| 5,121,180 | 6/1992 | Beringhause et al. ....... 73/517 R |
| 5,121,633 | 6/1992 | Murakami et al. .......... 73/517 R |

OTHER PUBLICATIONS

Frank Goodenbough, "Mass Production of Acceleration Sensor IC for Automobile Air Bag for Surface Micro-Machining Technology", *Nikkei Electronics*, No. 540, pp. 223–231 (with English Abstract) Nov. 11, 1991, (first publication: *Electronic Design* (1991), Penton Publishing, Inc.).

Primary Examiner—Richard Chilcot
Assistant Examiner—Eric S. McCall
Attorney, Agent, or Firm—Dickstein, Shapiro & Morin

[57] ABSTRACT

An acceleration detecting method and an acceleration sensor are disclosed. An inverted potential distribution structure of a metal-insulator-semiconductor type is formed on a semiconductor substrate. The deflection of the weight fixed above the semiconductor substrate with a predetermined space therebetween is detected by the output of the inverted potential distribution structure of a metal-insulator-semiconductor type. The inverted potential distribution structure of a metal-insulator-semiconductor type is turned on when the weight or the electrode on the surface thereof comes close to or comes into contact with the insulation film or the electrode on the semiconductor substrate. The capacitance of the inverted potential distribution structure of a metal-insulator-semiconductor type changes with the deflection of the weight.

19 Claims, 21 Drawing Sheets

DIFFUSION OF
N⁺
GROWTH OF SiO₂

ATMOSPHERIC
CVD

GROWTH OF
POLY-Si

DEPOSITION
OF Aℓ

ETCHING WITH
HYDROFLUORIC
ACID

ACCELERATION SENSOR

BACKGROUND OF THE INVENTION

1. Field of the Invention

The present invention relates to an acceleration sensor which utilizes a semiconductor technique.

2. Description of the Related Art

Recent vehicles are provided therein with an air bag system for the safety of the drivers, assistants and the like. The air bag system is a system for inflating the air bag placed in front of or beside the driver or the like when the acceleration becomes too large due to a collision or the like. In this system, therefore, a means for detecting the acceleration is essential for the purpose of triggering the action. As such an acceleration detecting means, it is possible to use an acceleration sensor which is composed of a semiconductor substrate as well as a conventional ball contact type acceleration sensor. Between the two, the former is expected to find a wide use not only in an air bag system but also as a means for detecting an acceleration because it is produced by applying a semiconductor technique and it is integrated into various semiconductor circuits.

FIGS. 21A and 21B show the structure of a conventional acceleration sensor. This acceleration sensor is disclosed in Nikkei Electronics, 1991, Nov. 11, No. 540, p. 224, etc.

Referring first to FIG. 21A, which shows the structure of the acceleration sensor and the circuit attached thereto. In the conventional acceleration sensor, a cantilever spring structure of polysilicon is formed on a silicon substrate 10.

The cantilever spring is provided with a pair of columns (leaf springs) 14 each having an anchor 12 at both ends thereof. The anchors 12 are fixed to the Si substrate 10 by a fixing member 16 made of polysilicon which is provided with conductivity. The columns 14 are therefore fixed above the Si substrate 10 with a predetermined space therebetween.

On the other hand, the columns 14 support a weight 18 made of polysilicon. The pair of columns 14 are placed in parallel on the Si substrate 10 in the state of being connected by the weight 18, as shown in FIG. 21A. When an acceleration is applied to the weight 18 in the direction indicated by the arrow in FIG. 21A, the weight 18 is deflected in the same direction as the direction of acceleration due to the elasticity of the columns 14. As will be described later, as the acceleration is indirectly detected from this deflection, the axis in the direction of the arrow is called a detection axis.

The weight 18 is provided with movable electrode plates 20 which are made of polysilicon in the shape of ribs. Fixed electrode plates 22 and 24 are fixed to the Si substrate 10 in the same way as shown in FIG. 21B. The fixed electrode plates 22 and 24 are arranged in pairs such that each pair of them meshes with the corresponding pair of rib pieces of the movable electrode plates, in other words, such that the distance between each pair of the fixed electrode plates 22, 24 and each pair of the rib pieces of the movable electrode plates 20 changes when the movable electrode plates 20 are deflected with the deflection of the weight 18. Therefore, when an acceleration is applied to the weight 18 in the direction of the detection axis, the distance between the fixed electrode plate 22 and the rib piece of the movable electrode plate 20 changes, resulting in a change of the capacitance.

As a circuit attached to such a structure, a circuit including a rectangular wave generator 26 of 1 MHz, a buffer amplifier 28, a modulation and low-pass filtering unit 30, a reference voltage generator 32, and a preamplifier 34 are shown in FIG. 21A. When 1 MHz voltages of opposite phases VA and VC each having a rectangular shape are applied from the rectangular wave generator 26 to the fixed electrode plates 22 and 24, a voltage VB is obtained from the columns 14 which are in contact with the movable electrode plates 20. Although the wirings between the movable electrode plates 20 and the fixed electrode plates 22, 24 in front of the weight 18 are shown in FIG. 21A, the similar wirings are actually conducted on those elements at the back of the weight 18.

Since the voltage VB is caused by the deflection of the movable electrode plates 20 which constitute a differential capacitor, the value indicates the deflection of the weight 18 due to the acceleration, as shown in FIG. 22A. The voltage VB is input to the modulation and low-pass filtering unit 30 through the buffer amplifier 28, and the output of the modulation and low-pass filtering unit 30 is input to the circuit at the next stage by the preamplifier 34 to which an offset is given by the reference voltage generator 32.

In this way, the conventional acceleration sensor which can be produced by using a semiconductor technique is realized.

The acceleration sensor having the above-described structure, however, has the following problems. The complicated structure makes the production difficult, which leads to a high price. Since the capacitance related to the detection of the acceleration is minute, it is impossible to secure the stability of the detection characteristic when the acceleration changes, and the sensitivity of the sensor is low.

SUMMARY OF THE INVENTION

Accordingly, it is an object of the present invention to eliminate the above-described problems in the related art and to provide an acceleration sensor which has a simpler structure, stable properties, a high sensitivity, which is produced at a low cost, which is stable with time, and which produces a linear and reproducible output with respect to an acceleration.

To achieve this aim, in one aspect of the present invention, there is provided an acceleration sensor having a semiconductor substrate, comprising:

(a) a bridge structure formed on the semiconductor substrate, the bridge structure including:

(a1) a weight having a predetermined mass; and (a2) a direction regulating member for regulating the direction of deflection of the weight which is produced when an acceleration is applied thereto, to a predetermined direction which is approximately parallel to the surface of the semiconductor substrate; and (b) a plurality of metal-insulator-semiconductor type elements (hereinunder referred to as "MIS elements") which are formed in the semiconductor substrate in the direction of deflection of the weight, the output of each of the MIS elements being controlled by the deflection of the weight.

In another aspect of the present invention, there is provided an acceleration detecting method comprising the steps of:

(a) regulating the direction of deflection of a weight having a predetermined mass to a predetermined direction which is approximately parallel to the surface of a semiconductor substrate by a direction regulating member which is formed on the semiconductor substrate; and (b) monitoring the outputs of a plurality of MIS elements which are formed in the semiconductor substrate in the direction of deflection of the weight and detecting the acceleration in the predetermined direction which is applied to the weight by a predetermined processing of outputs of the MIS elements.

In still another aspect of the present invention, there is provided a vehicle safety apparatus comprising:

(a) an acceleration sensor including;

(a1) a bridge structure formed on the semiconductor substrate, the bridge structure being provided with:

(a11) a weight having a predetermined mass; and (a12) a direction regulating member for regulating the direction of deflection of the weight which is produced when an acceleration is applied thereto, to a predetermined direction which is approximately parallel to the surface of the semiconductor substrate; and (a2) a plurality of MIS elements which are formed in the semiconductor substrate in the direction of deflection of the weight, the output of each of the MIS elements being controlled by the deflection of the weight; and (b) a means for operating a safety mechanism in accordance with the output of the acceleration sensor.

In the present invention, a weight and a direction regulating member are formed on a semiconductor substrate. These weight and direction regulating member constitute a bridge structure. The direction regulating member regulates the direction of deflection of the weight caused when an acceleration is applied thereto to a predetermined direction which is approximately parallel to the surface of the semiconductor substrate. The weight is deflected in accordance with the application of the acceleration in a predetermined direction.

In the semiconductor substrate are formed a plurality of MIS elements in the direction of deflection of the weight, in other words, in the direction in which the weight can be deflected. The output of each of these MIS elements is controlled by the deflection of the weight. Therefore, by monitoring the output of each MIS element and by a predetermined processing of the detected output, the acceleration applied to the weight is detected in the direction of deflection of the weight.

It is possible to use the thus-detected acceleration for the purpose of controlling a safety mechanism such as an air bag. Accordingly, the use of the acceleration sensor of the present invention can ensure the safety of the driver or the like of a vehicle.

The acceleration sensor of the present invention is realized by a simpler structure than a conventional acceleration sensor. In other words, it is possible to detect an acceleration by a simpler structure which is composed of the weight and the direction regulating member than a conventional acceleration sensor which uses movable electrode plate in the shape of ribs. This means that it is possible to produce an acceleration sensor of the present invention by a more simplified method and, hence, at a lower cost than the conventional acceleration sensor.

In addition, the detection characteristic of the acceleration sensor of the present invention is more stable than that of the conventional acceleration sensor. This is because while the conventional acceleration sensor detects an acceleration by detecting a change in the capacitance between the end surfaces of the movable electrode plate and each of the fixed electrode plates, the acceleration sensor of the present invention detects an acceleration by monitoring the outputs of a plurality of MIS elements formed in the semiconductor substrate. Therefore, the detection sensitivity of the acceleration sensor of the present invention is higher. For the same reason, the acceleration detection characteristic becomes more stable. That is, the acceleration sensor of the present invention has a more stable detection characteristic with respect to a change of acceleration and has a superior reproducibility.

The plurality of MIS elements in the acceleration sensor of the present invention may be constituted by either MIS transistors or MIS capacitors.

When they are constituted by MIS transistors, each transistor is formed in the semiconductor substrate so that when the weight comes close thereto, it turns on or off. The MIS transistor is generally composed of a metal electrode, an insulation film and semiconductor layers. In the present invention, the structure of the MIS transistor is divided into the following two types depending upon the structure of the metal electrode.

In a first type of structure, the metal electrode is formed such that it is deflected with the deflection of the weight. The insulation film is formed on the surface of the semiconductor substrate, and a source domain and a drain domain are formed in the semiconductor substrate with a space therebetween so that a channel is formed in the space. The channel of each MIS transistor is formed in such a manner that it faces the metal electrode through the insulation film when the metal electrode comes close to the channel. Therefore, it can be said that the MIS transistors have the metal electrode in common while each MIS transistor individually has an insulation film and a channel.

In this structure, when a voltage is applied to the metal electrode, an electric field is generated. The electric field generated acts as a gate electric field on only the MIS transistor which is close to the metal electrode. Therefore, when the weight is deflected, the metal electrode is deflected, and each MIS transistor is turned on/off with the approach/withdrawal of the metal electrode.

It is easy to produce this structure by an MIS process, namely, the structure in which a plurality of MIS transistors are arranged while having the metal electrode in common so that one of the MIS electrodes selectively turns on/off with the deflection of the metal electrode. Since the acceleration is detected not on the basis of a change in the capacitance, the acceleration sensor having this structure is exempt from the problems suffered from in the conventional acceleration sensor.

In a second type of MIS transition structure, first metal electrodes are formed on the semiconductor substrate through the insulation films, and a second metal electrode is formed in such a manner as to be deflected together with the weight. The insulation films and the channels have the same structure as those in the first structure.

In this structure, a voltage applied to the second metal electrode on the electric field generated when the voltage is applied to the second metal electrode acts only on the first electrode of the MIS transistor situated close to the second metal electrode and does not act on the first electrodes of the other MIS transistors. Therefore each MIS transistor is turned on/off with the deflection (approach/withdrawal) of the second metal electrode.

It is also easy to produce this structure by an MIS process. Since the acceleration is detected not on the basis of a change in the capacitance, the acceleration sensor having this structure is exempt from the problem suffered from in the conventional acceleration sensor. In addition, the behavior of each MIS transistor is more stable than that in the first structure.

When the MIS transistors are used as the MIS elements, the plurality of MIS transistors may have, for example, a common drain structure. In addition, if the plurality of MIS transistors are arranged in two rows with the common drain domain interposed therebetween, the MIS transistors are usable in pairs, which makes the detection characteristic more stable. An aluminum electrode is usable as each of the metal electrodes, and an oxide film is usable as each of the insulation films.

When the MIS elements are constituted by MIS capacitors, each of the insulation films formed on the surface of the semiconductor substrate is used as the dielectric layer of each MIS capacitor. A high density impurity layer is formed for each MIS capacitor in the semiconductor substrate. A metal electrode which is deflected with the deflection of the weight is provided above the semiconductor substrate.

In this structure, the capacitance of each MIS capacitor changes with the deflection of the weight. The acceleration applied to the weight is detected as a change in the capacitance. If the plurality of MIS capacitors are incorporated into a bridge circuit, for example, such a change in the capacitance of each MIS capacitor can be used to detect the acceleration. Since these MIS capacitors are interposed between the metal electrode and the high density impurity layer, in other words, they are face-to-face capacitors, the capacitance is not minute unlike that in the conventional acceleration sensor. This means that this structure enables more stable acceleration detection than the structure of the conventional acceleration sensor.

In any of the above-described three types of structure, namely, the two types of structure using MIS transistors and the structure using MIS capacitors, it is possible to obtain a linear output of the acceleration sensor. In the case of using MIS transistors, if the MIS transistors are arranged at regular pitches, the output becomes linear with respect to the acceleration. In the case of using MIS capacitors, differential arrangement of MIS capacitors realizes a linear output.

The direction regulating member for regulating the direction of deflection of the weight is realized by a plurality of columns having elasticity in the direction approximately parallel to the surface of the semiconductor substrate. In this case, one end of each column is fixed to the semiconductor substrate and the other end is connected to the weight. The plurality of columns and the weight are made of polysilicon or the like and can be integrally formed. In order to provide each column with elasticity and resistance to repeated loading, each column has a bent portion which is bent in a plane approximately parallel to the surface of the semiconductor substrate.

The direction of deflection of the weight may be regulated to one direction or two directions. In the latter case, two-dimensional acceleration detection is possible.

Such an acceleration sensor according to the present invention can be produced by using a semiconductor technique. In other words, an acceleration sensor according to the present invention can be integrated with a peripheral circuit. This is a merit of an acceleration sensor according to the present invention. Another merit of an acceleration sensor according to the present invention is that since it has a simple structure, it can be produced by a simpler process than the conventional acceleration sensor.

An acceleration sensor according to the present invention is produced, for example, by the following process. An impurity diffusion layer is first formed in the semiconductor substrate by diffusing impurities in the semiconductor substrate. The impurity diffusion layer constitutes a source, a drain or the like in the structure in which MIS transistors are used as the MIS elements, and constitutes an electrode at one end of a planar capacitor in the structure in which MIS capacitors are used as the MIS elements. By oxidizing the surface of the semiconductor substrate, a semiconductor oxide layer is next formed. The oxide layer constitutes an "I" layer in the structure in which MIS transistors are used as the MIS elements, and constitutes a dielectric layer in the structure in which MIS capacitors are used as the MIS elements. Thereafter, a film having a predetermined thickness is formed on the semiconductor oxide layer in such a manner as to cover at least the impurity diffusion layer. Further, a film covering this layer and bridging over the semiconductor substrate is formed. The film between the bridging film and the oxide layer is a sacrificial layer which is to be removed at a later step. The bridging film functions as the weight and the columns. After a metal electrode is formed at a predetermined position of the bridging film, the film between the bridging film and the oxide layer is removed. The metal electrode formed on the bridging film functions as the metal electrode which deflects with the deflection of the weight.

In this way, an acceleration sensor according to the present invention is produced by a simple process.

The above and other objects, features and advantages of the present invention will become clear from the following description of the preferred embodiments thereof, taken in conjunction with the accompanying drawings.

BRIEF DESCRIPTION OF THE DRAWINGS

FIGS. 16A to 16E show the process of producing the capacitors C1 and C2 of the third and the fourth embodiments, wherein FIG. 16A shows an N⁺ diffusion process and an $SiO_2$ growth process;

FIG. 16B shows an atmospheric CVD process;

FIG. 16C shows a polysilicon growth process;

FIG. 16D shows an Al evaporation process; and

FIG. 16E shows hydrofluoric acid etching process;

FIGS. 21A and 21B show the structure of a conventional acceleration sensor, wherein FIG. 21A shows the structure and the circuit thereof; and FIG. 21B shows the structure of the fixing portion of a column.

DESCRIPTION OF THE PREFERRED EMBODIMENTS

Preferred embodiments of the present invention will be explained hereinunder with reference to drawings.

Figure 1:
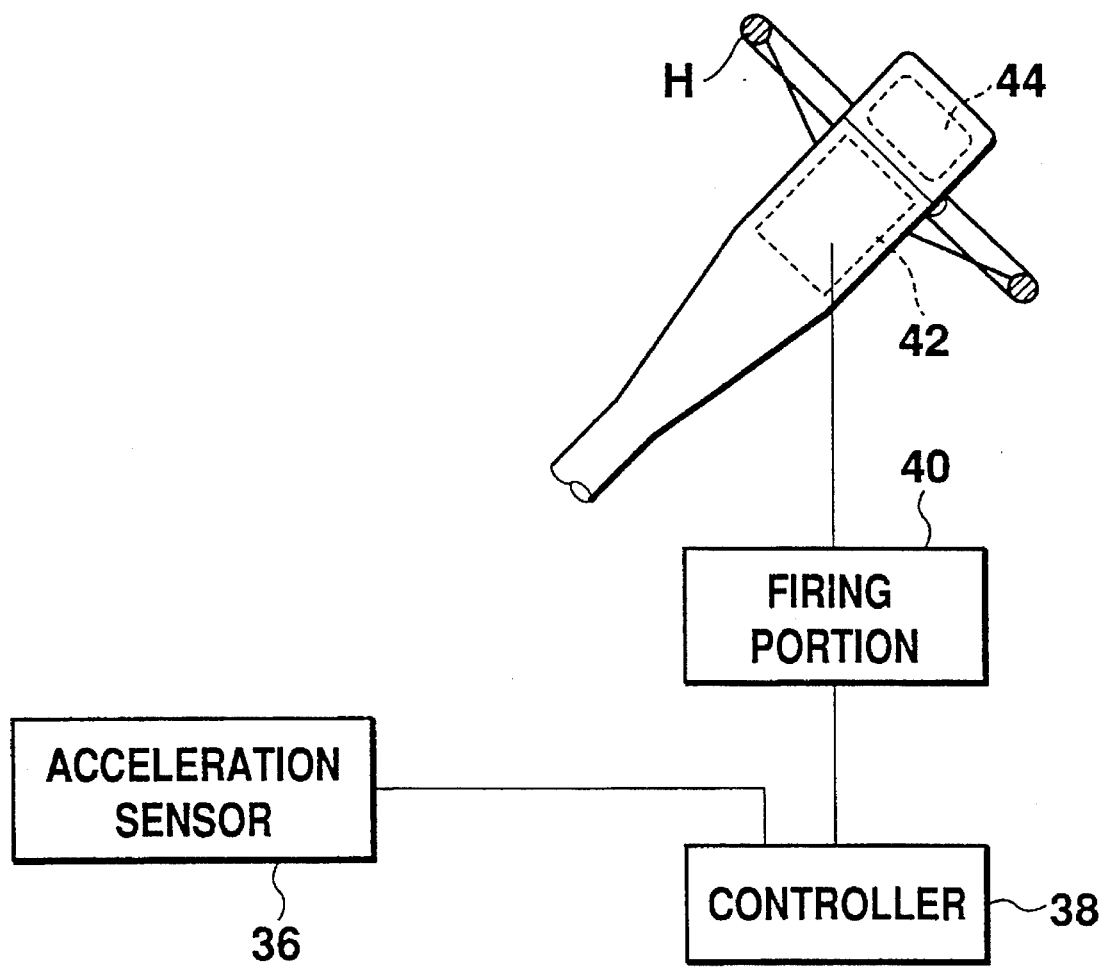
FIG. 1 is a block diagram of an example of usages of an acceleration sensor according to the present invention.

Referring first to FIG. 1, an example of usages of an acceleration sensor according to the present invention is shown. This example is an air bag system provided in a vehicle. This air bag system is composed of a controller 38, a firing portion 40, an inflator 42 and an air bag 44 as well as an acceleration sensor 36. When a precipitous acceleration is found by the acceleration sensor 36, the controller 38 supplies a signal to the firing portion 40, and the firing portion 40 operates the inflator 42 in accordance with the signal. The inflator 42 generates inert gas in accordance with the command of the firing portion 40 and jets the gas into the air bag 44 which is attached to a steering wheel H. The gas inflates the air bag 44. The driver or the like is thus protected from the shock caused by the acceleration by the air bag 44. In other words, the driver is prevented from hitting his heart against the steering wheel H.

Figure 2:
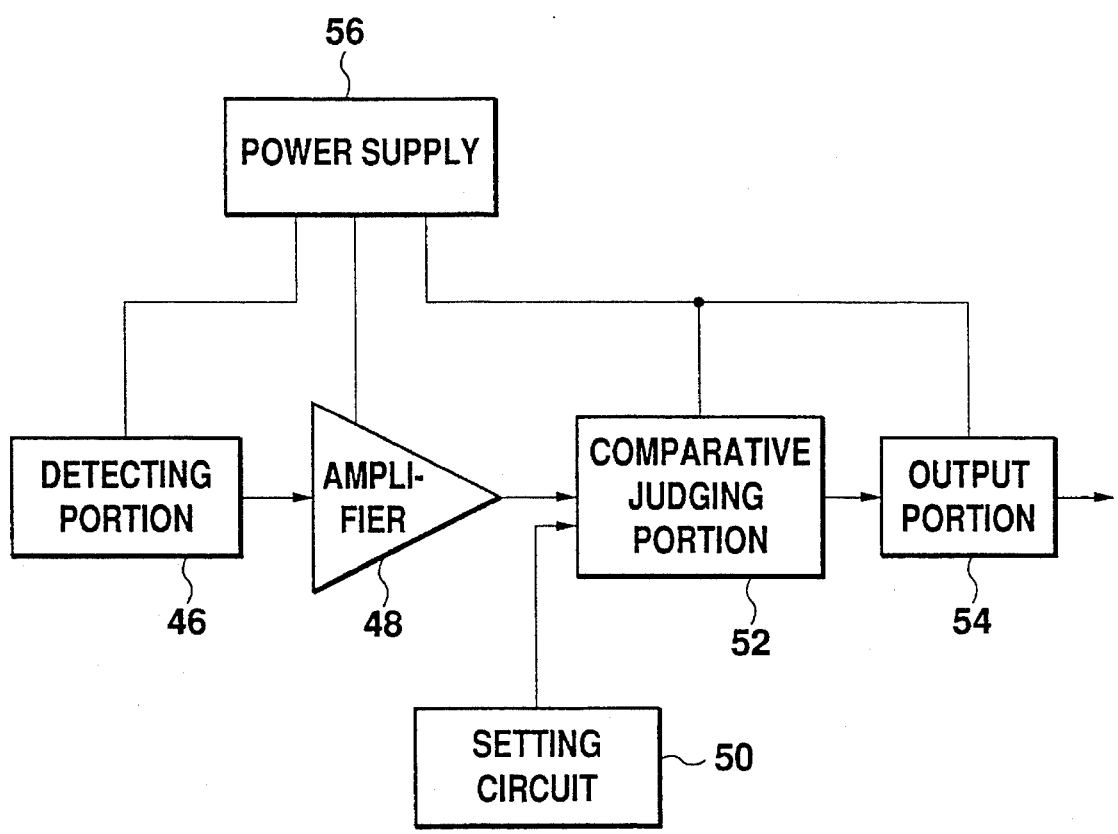
FIG. 2 is a block diagram of a circuit of first and second embodiments of an acceleration sensor according to the present invention.

FIG. 2 shows the an example of the circuit structure of the acceleration sensor 36. The circuit shown in FIG. 2 is a circuit of first and second embodiments of an acceleration sensor according to the present invention in which MOS transistors are used as the MIS elements. This circuit is composed of a detecting portion 46, an amplifier 48, a setting circuit 50, a comparative judging portion 52, an output portion 54 and a power supply 56. These elements except the detecting portion 46 can be integrally provided with the controller 38 shown in FIG. 1.

The output of the detecting portion 46 linearly changes with respect to the acceleration applied thereto. The amplifier 48 amplifies the output of the detecting portion 46 and supplies it to the comparative judging portion 52. The comparative judging portion 52 compares the output of the amplifier 48 with the value set by the setting circuit 50, and if it satisfies a predetermined condition which indicates that the acceleration is beyond the standard level, a signal is generated. When the signal is generated, the output portion 54 outputs the signal to the controller 38 (or to the firing portion 40 when the controller is integral with the output portion 54), thereby operating the air bag 44. The power supply 56 supplies power to each part of the circuit. It is possible to dispense with the comparative judging portion 52 and to output the absolute value of the acceleration.

In this circuit structure, the elements other than the detecting portion 46 can be provided by using a conventional circuit. The detecting portion 46, which is characteristic of the present invention, is realized, for example, by the structure shown in FIGS. 3 to 8, which shows the structure of the detecting portion of the first embodiment of the present invention.

Figure 3:
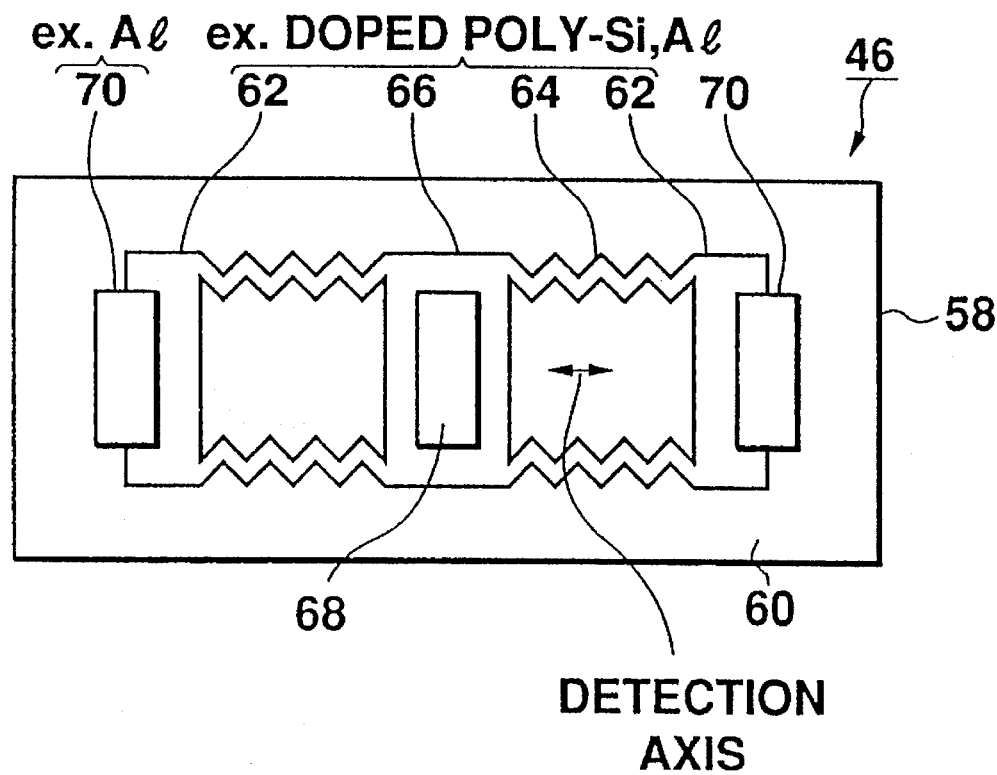
FIG. 3 is a plan view of the structure of the detecting portion of the first embodiment of the present invention.
Figure 4:
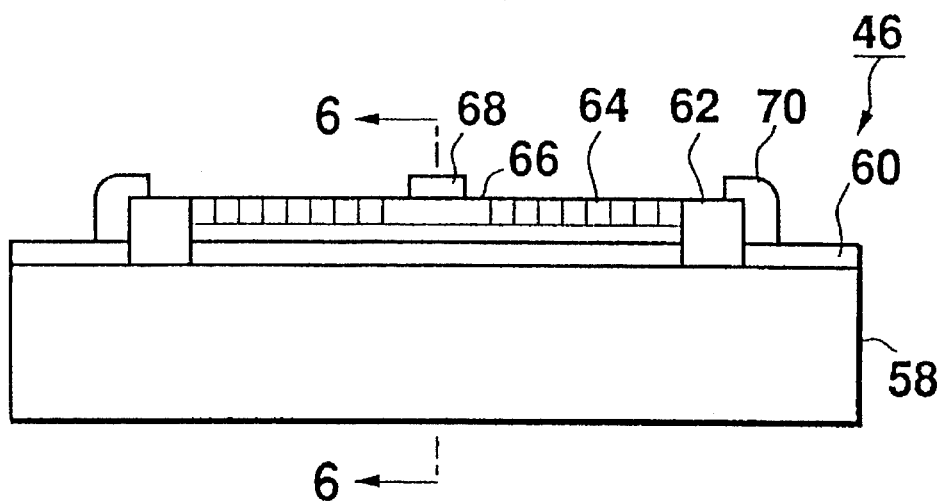
FIG. 4 is a side elevational view of the structure of the detecting portion shown in FIG. 3.

FIG. 3 is a plan view of the first embodiment and FIG. 4 is a side elevational view thereof. The detecting portion 46 in this embodiment is formed on a semiconductor substrate 58 by using metal-oxide-semiconductor (MOS) processes. The semiconductor substrate 58 is, for example, a P type Si substrate and an oxide layer 60 is formed on the surface.

Figure 5:
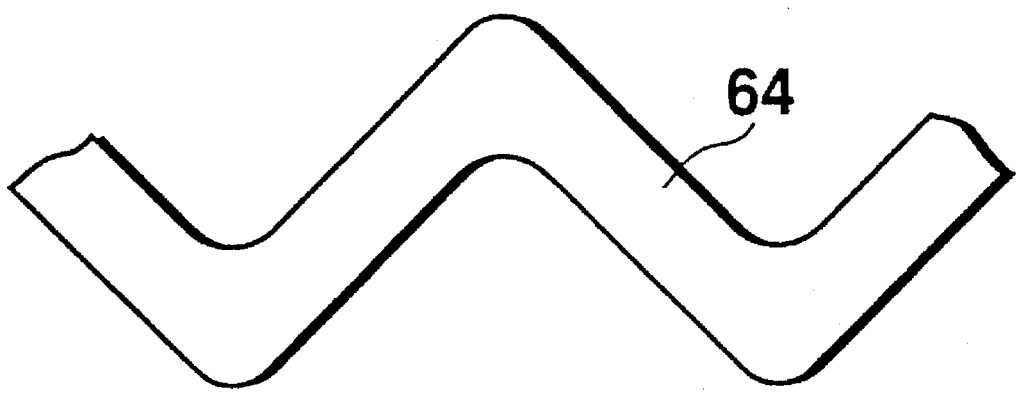
FIG. 5 is a partially enlarged view of a column in the first embodiment shown in FIG. 3.

On the semiconductor substrate 58, a spring structure is further formed which is composed of fixing portions 62, columns 64 and a weight 66. These elements are integrally provided by using doped polysilicon (in drawings, referred to as "doped poly-Si"), metal materials or the like. The weight 66 is fixed above the semiconductor substrate 58 with a space therebetween so that when the acceleration is applied to the weight 66 in the direction of the detection axis indicated by the arrow in FIG. 3, the weight 66 is deflected in the same direction due to the elasticity of the columns 64. The weight 66 is connected to the fixing portions 62 through the columns 64 having bent portions, and the fixing portions 62 are fixed to the semiconductor substrate 58. The bent portion of the column 64 is rounded so as to tolerate repeatedly applied loads, as shown in FIG. 5. Since the weight 66 does not have electrodes in the shape of ribs unlike a conventional one, the amount of the deflection of the weight 66 is difficult to regulate.

If it is assumed that the acceleration in the direction of the detection axis applied to the weight 66 is α, the deflection Δx is obtained from the following equation:

$$\Delta x = (m/k) \cdot \alpha$$

wherein m represents the mass of the weight 66, and k the spring constant of the columns 64.

Accordingly, if the weight 66 and the columns 64 are designed so that m/k takes an appropriate value, it is possible to detect the necessary acceleration α while keeping the size of the detection portion 46 and the deflection range of the weight 66 appropriate. For example, in the case of detecting the acceleration in the range of 30 to 50G, the thickness of the column 64 is set to 2 to 5 μm.

In this embodiment, the deflection caused by the acceleration α is detected as the output of the MOS transistor array. The detected acceleration is linear with respect to the deflection, namely, the acceleration α. The thin film electrode 68 formed on the surface of the weight 66 functions as the gate electrode of the MOS transistor array. A gate voltage +Vg is applied to the thin electrode 68 through guides 70 composed of a metal such as Al, the fixing portion 62 having conductivity, the columns 64 and the weight 66.

Figure 6:
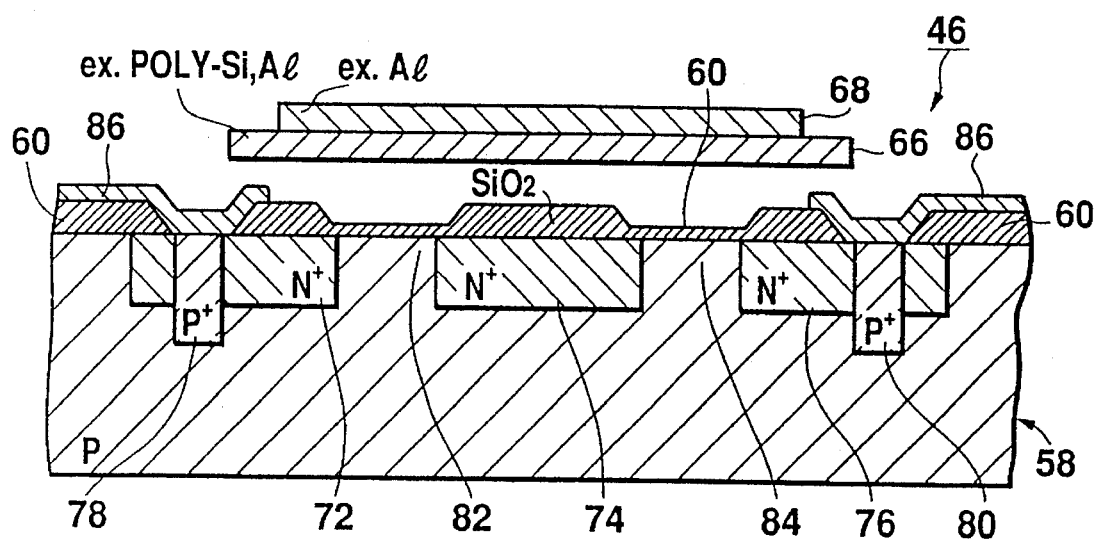
FIG. 6 is an end-face view of the detecting portion shown in FIG. 4, taken along the line A—A.

FIG. 6 is an end-face view of the detecting portion 46 shown in FIG. 4, taken along the line A—A. This shows the the structure of MOS transistors which constitute an array in this embodiment.

The thin film electrode 68 as the gate electrode is disposed above the semiconductor substrate 58 with a gap of about several thousand angstrom therebetween so that it is coupled with the semiconductor substrate 58 by an electric field through the oxide layer 60 of about 500 to 5000 angstrom thick, in other words, so as to have a MOS structure. The gap is set in accordance with the gate voltage +Vg. There is no problem if the lower portion of the weight 66 is in contact with the oxide layer 60.

An $N^+$ diffusion layer and a $P^+$ diffusion layer are formed at predetermined positions (domains) in the semiconductor substrate 58. In the case of using a P type Si substrate as the semiconductor substrate 58, $N^+$ diffusion layers are formed in three portions (72, 74, 76) in FIG. 6, and $P^+$ diffusion layers are formed in the $N^+$ diffusion layers 72 and 76 on both sides. The $N^+$ diffusion layer at the center forms a common drain 74, and the $N^+$ diffusion layers at both sides form individual sources 72, 76. In other words, In FIG. 6, MOS transistors having channels 82 and 84, respectively, are formed on both sides. The $P^+$ diffusion layers in the MOS transistors function as channel stoppers 78, 80.

Figure 7:
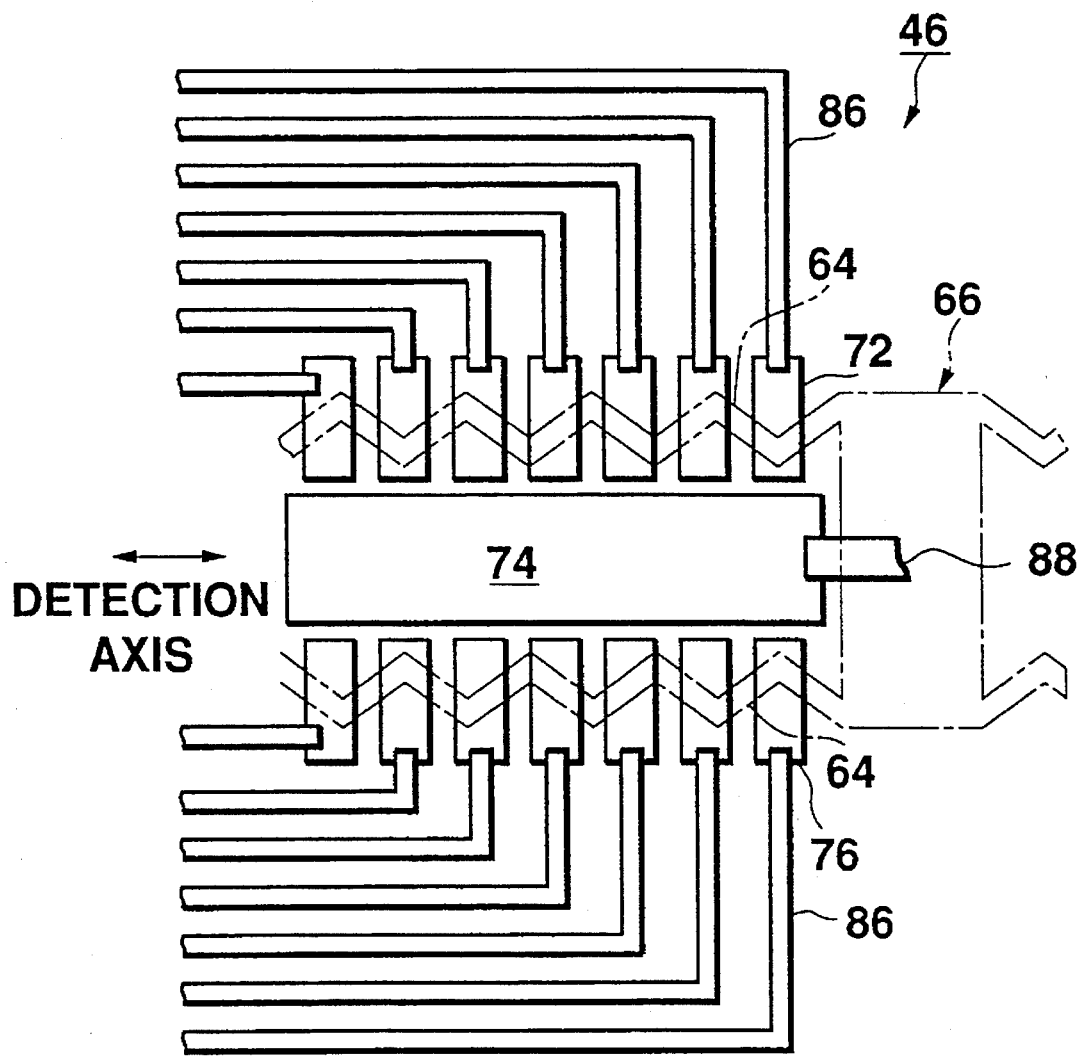
FIG. 7 is a plan view of an example of the layout of MOS transistors in the first embodiment.

On the surface of the semiconductor substrate 58, wirings 86 for connecting the respective individual sources 72 are formed as well as the $SiO_2$ oxide layer. FIG. 7 shows the detecting portion 46 of this embodiment seen from above through the weight 66 and the like, in other words, a layout pattern of MOS transistors.

As shown in FIG. 7, in this embodiment, a plurality of sources 72, 76 are arranged in the longitudinal direction of the drain 74, namely, in the longitudinal direction of the columns 64. The wiring 86 made of Al connects each source 72 (76), and the wiring 88 made of Al connects the common drain 74. These elements are formed in the same process (deposition or the like) as the process for the guide 70.

Figure 8:
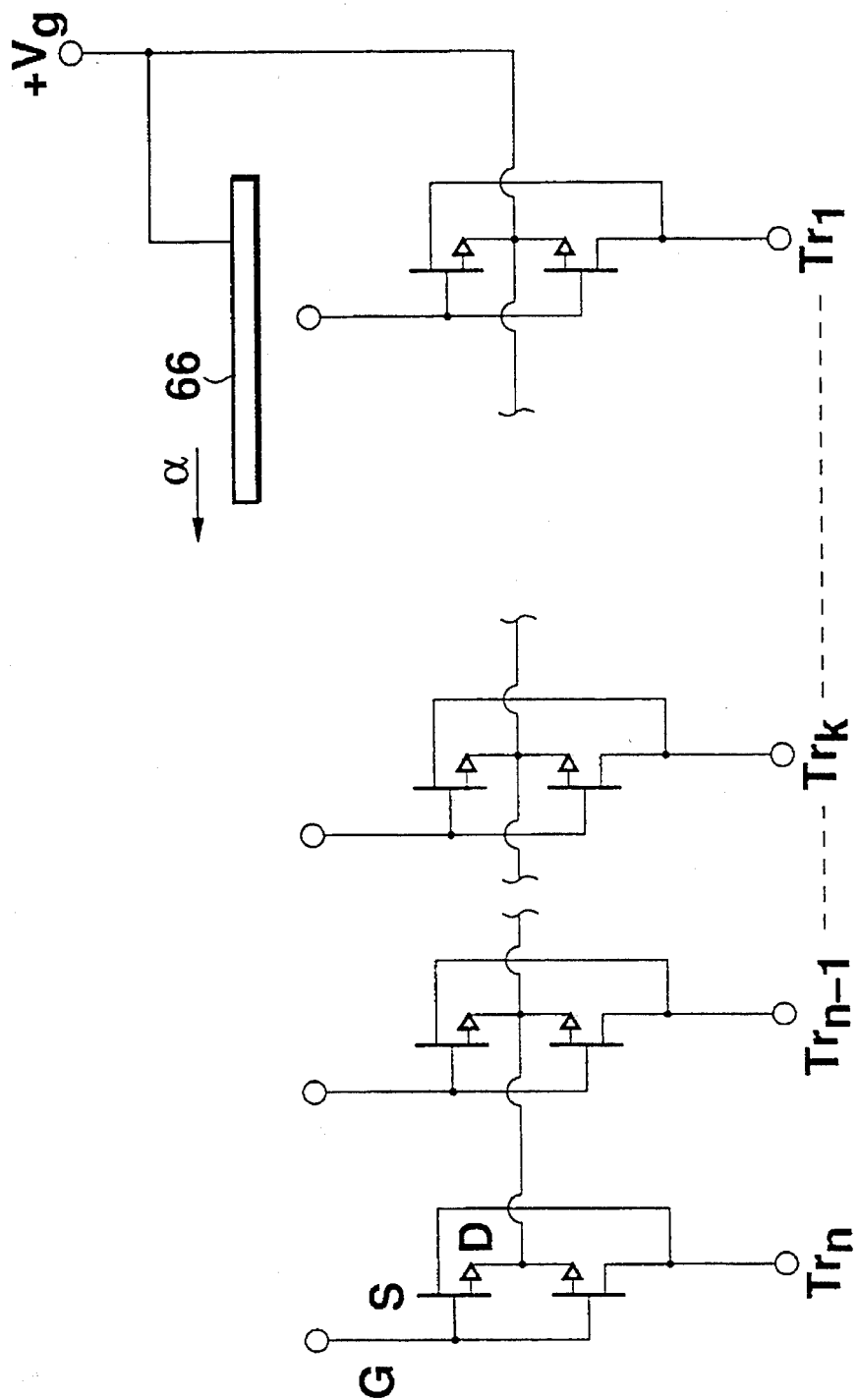
FIG. 8 is a simplified equivalent circuit of the MOS transistor array in the first embodiment.

In this way, an MOS transistor array having a simple equivalent circuit such as that shown in FIG. 8 is formed. That is, an MOS transistor array is composed of 2n MOS transistors each having a drain D connected in common. In FIG. 8, each pair of MOS transistors corresponds to the MOS transistors in FIG. 7 produced by forming the sources 72, 76 with the drain 74 therebetween, and it is because the sources 72 and 76 are situated at the same position in the direction of the detection axis that the gates G of each pair of transistors are connected in common. When the wirings 86 for connecting the sources 72 and 76 are connected, the sources S of each pair of transistors are also connected in common.

When the weight 66 is deflected by the acceleration α applied thereto, the thin film electrode 68 approaches the channel 82 or 84 of one MOS transistor. Since the gate voltage +Vg is applied to the thin film electrode 68, as described above, the MOS transistor is turned on by the approach of the thin film electrode 68. Therefore, the deflection of the weight 66 is detected by detecting which MOS transistor is on. If the sources 72 and 76 are arranged at the same pitches, the deflection of the weight 66 is linearly detected. The outputs of the pairs of transistors Tr1 to Trn are input to the comparative judging portion 52 through the amplifier 48.

Although it is preferable from the point of view of detection stability to provide sources on both sides of the drain 74 as the sources 72, 76, it is possible to provide them only on one side of the drain 74. The integral provision of the drain 74 is not always necessary. When the drains are provided for the respective MOS transistors, it is necessary to connect the drains by thin film electrodes or the like.

Figure 9:
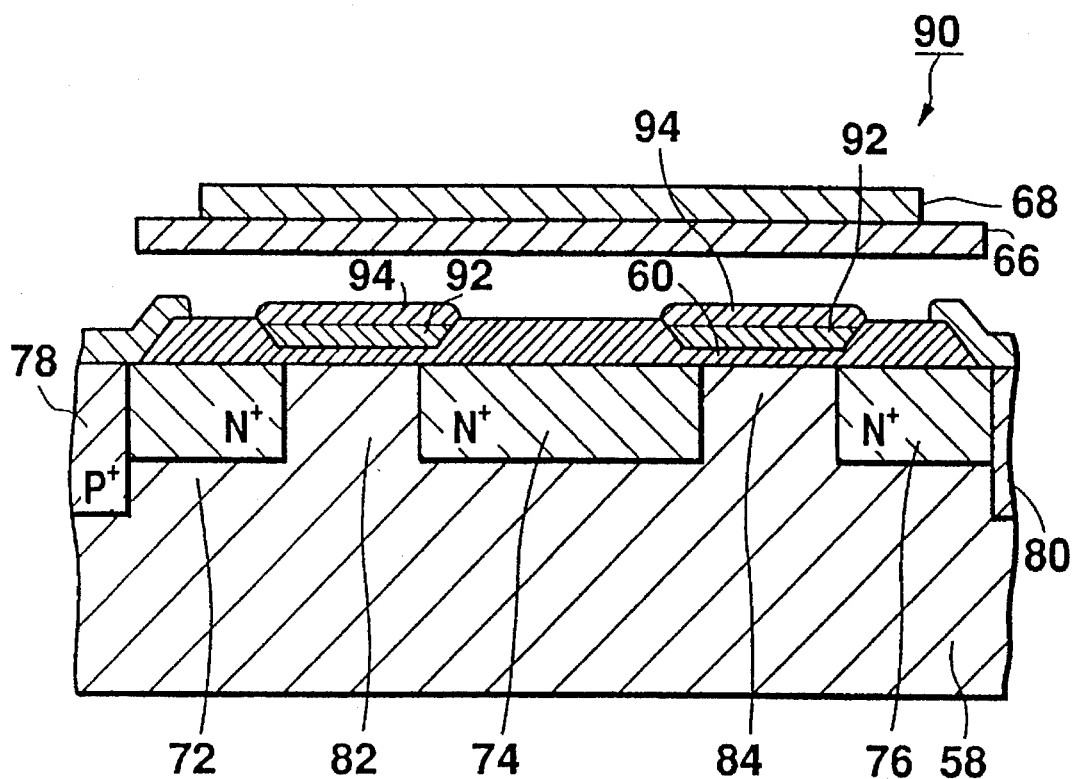
FIG. 9 is an end-face view of the detecting portion of the second embodiment, taken along the line A—A.

FIG. 9 shows the structure of a detecting portion 90 in the second embodiment of the present invention. In this embodiment, polysilicon thin films 92 and metal films 94 are added to the detecting portion in the first embodiment. The polysilicon thin films 92 and the metal films 94 are laminated in that order on the channels 82 and 84. In this structure, since the metal thin film 94 can function as the metal layer of a MOS transistor, the behavior of the MOS transistor is more stabilized by the contact between the weight 66 and the like and the metal thin film 94.

Figure 10:
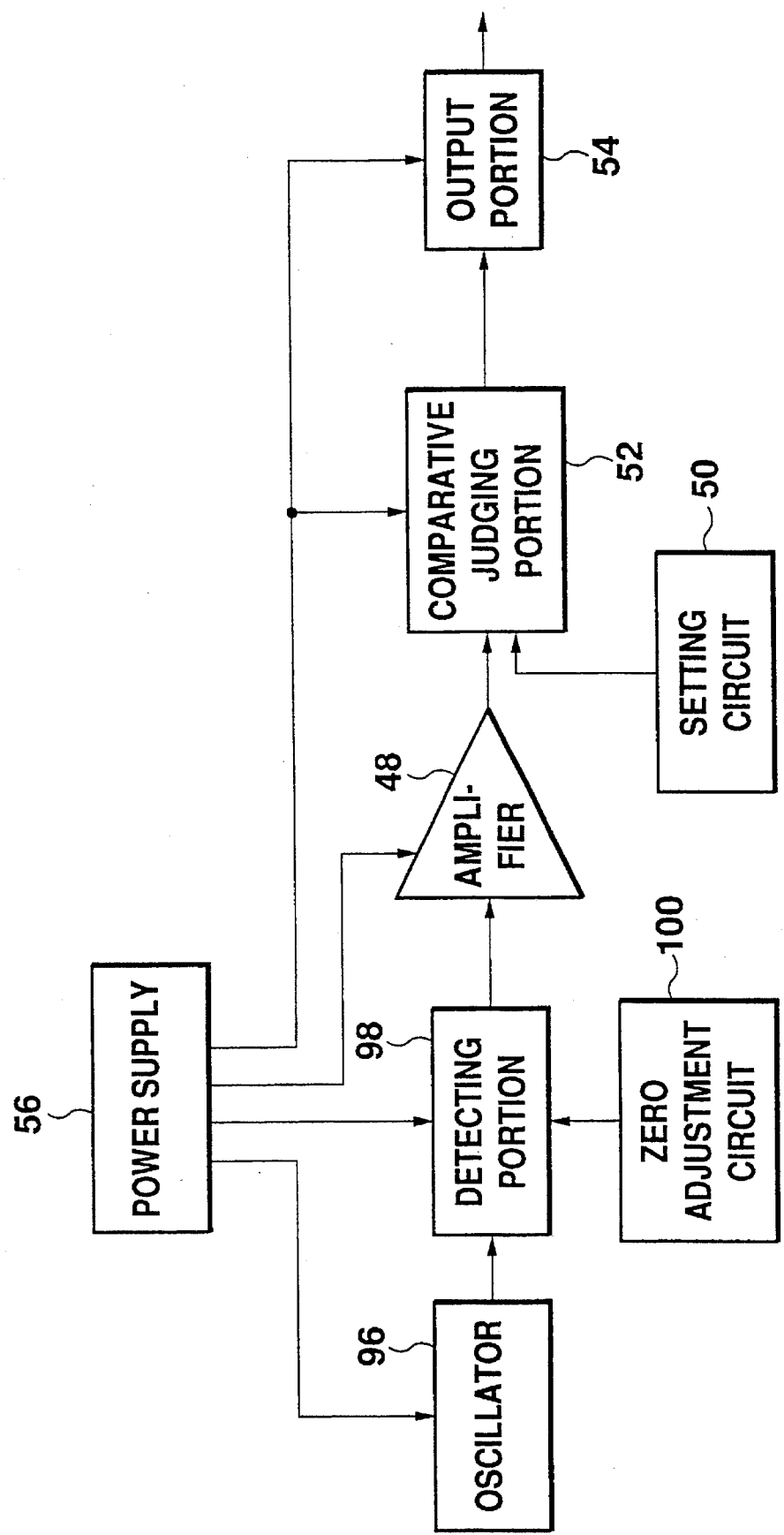
FIG. 10 is a block diagram of a circuit of third and fourth embodiments of an acceleration sensor according to the present invention.

FIG. 10 shows the structure of third and fourth embodiments of an acceleration sensor according to the present invention. In these embodiments, an oscillator 96, a detecting portion 98 and a zero adjustment circuit 100 are provided in place of the detecting portion 46 shown in FIG. 2. The detecting portion 98 in these embodiments detects the deflection of the weight by MOS capacitors not by a MOS transistor array as in the first and the second embodiments. The oscillator 96 supplies a signal of a predetermined frequency to the detecting portion 98, and the detecting portion 98 outputs an unbalance voltage to the amplifier 48 when the weight 66 is deflected. The zero adjustment circuit 100 adjusts the output voltage of the detecting portion 98 to 0 when the acceleration is 0.

Figure 11:
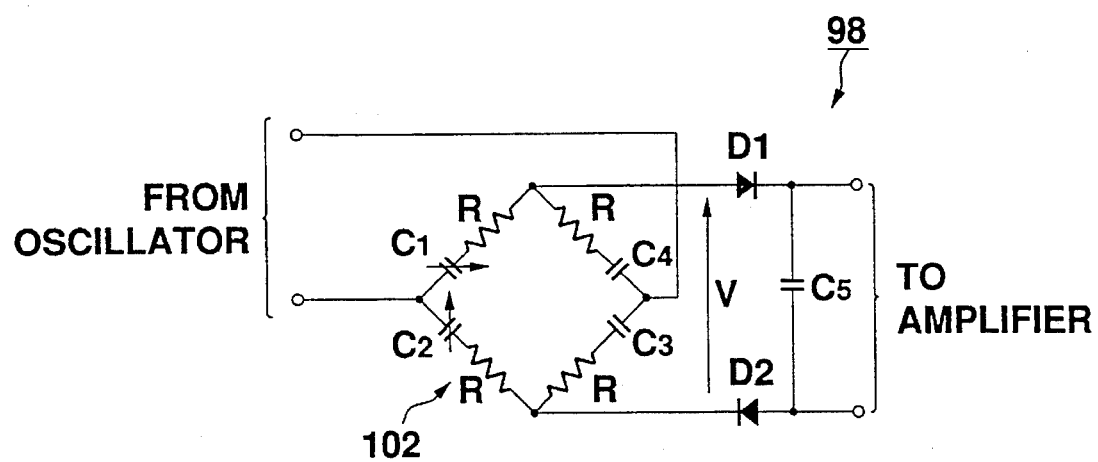
FIG. 11 is a circuit diagram of the structure of the detecting portion of the third embodiment of the present invention.

FIG. 11 shows the circuit structure of the detecting portion 98 of the third embodiment. As shown in FIG. 11, the detecting portion 98 has a bridge circuit 102 each side of which is an RC series circuit. The resistance of each side is constantly equally R, but the capacitances of capacitors C1, C2, C3 and C4 are equally $C_0$ ($C_0$: constant) only when the weight 66 is standing. The output of the oscillator 96 is input to the bridge circuit 102, and the output of the bridge circuit 102 is supplied to the amplifier 48 through diodes D1, D2 and a capacitor C5.

Figure 12:
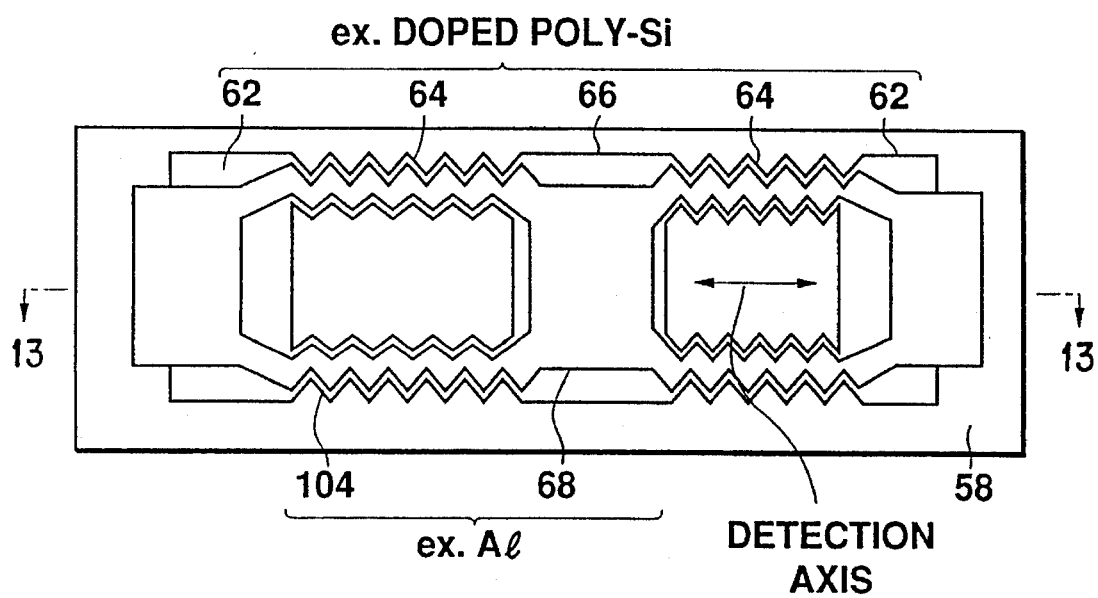
FIG. 12 is a plan view of the structure of capacitors C1 and C2 of the third embodiment.
Figure 13:
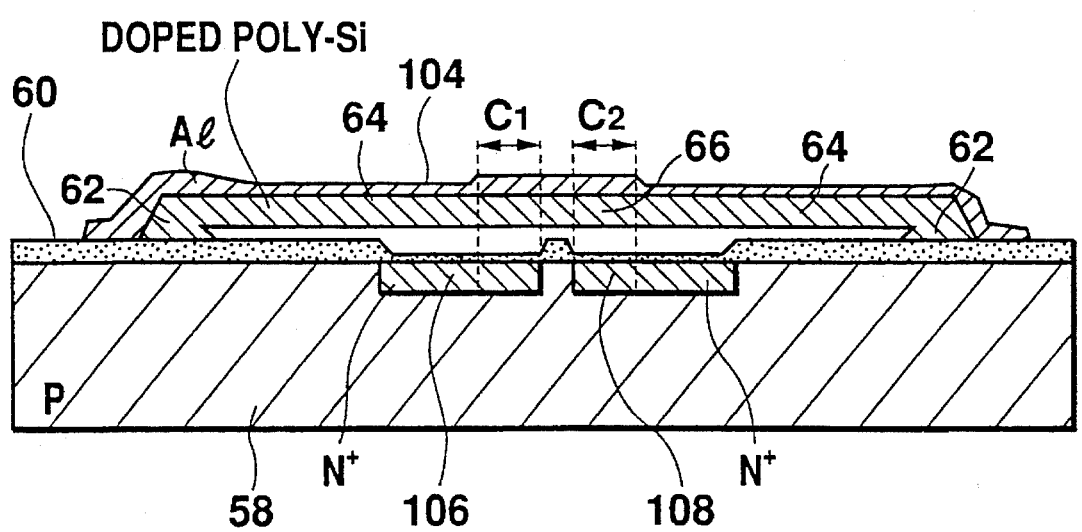
FIG. 13 is a sectional view of the capacitors C1 and C2 of the third embodiment shown in FIG. 12, taken along the line B—B.

This embodiment is characterized in that while the capacitances of C3 and C4 are constantly $C_0$, the capacitors C1 and C2 are reciprocal variable capacitors which are realized by a spring structure approximate to that in the first and second embodiments. FIGS. 12 and 13 show the spring structure, namely, the structure of the capacitors C1 and C2 in this embodiment.

As shown in FIGS. 12 and 13, a bridge structure of polysilicon Si or the like is also formed in this embodiment. In this embodiment, metal wirings 104 of Al or the like is formed on the columns 64 in such a manner, and $N^+$ diffusion layers 106 and 108 are arranged in the direction of the detection axis in the semiconductor substrate (P type Si substrate) 58. These $N^+$ diffusion layers 106, 108 and the movable electrode 68 are opposed to each other, and they are arranged such that the MOS capacitance between the movable electrode 68 and the $N^+$ diffusion layer 106 is equal to the MOS capacitance between the movable electrode 68 and the $N^+$ diffusion layer 108 when the weight 66 is standing. These MOS capacitances are used as the capacitances of the capacitors C1 and C2, respectively, on the bridge circuit 102.

It is therefore understood that when the weight 66 is deflected in the direction of the detection axis by the acceleration, the values of the capacitors C1 and C2 reciprocally change. With the generation of the deflection, the balance of the bridge circuit 102 is lost and an unbalance voltage is output from the detecting portion 98. The unbalance voltage linearly changes with respect to the deflection of the weight 66 and, hence, the acceleration.

Figure 14:
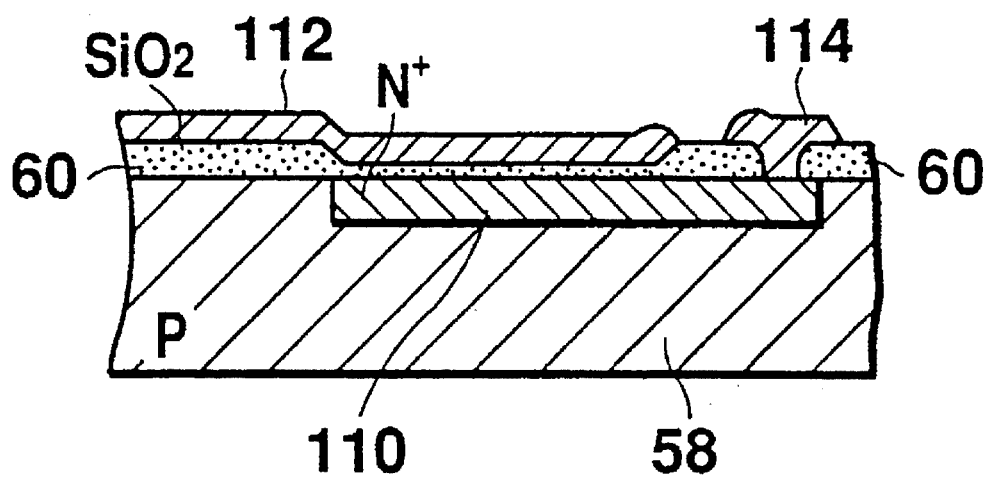
FIG. 14 is a sectional view of the structure of capacitors C3 and C4 of the third and the fourth embodiments of the present invention.

FIG. 14 shows the structure of the capacitors C3 and C4 in this embodiment. Each of the capacitors C3 and C4 is a MOS capacitor produced by forming an $N^+$ diffusion layer 110 in the semiconductor substrate (P type Si substrate) 58, and then forming an oxide layer 60 and an introducing electrode 114 thereon.

Figure 15:
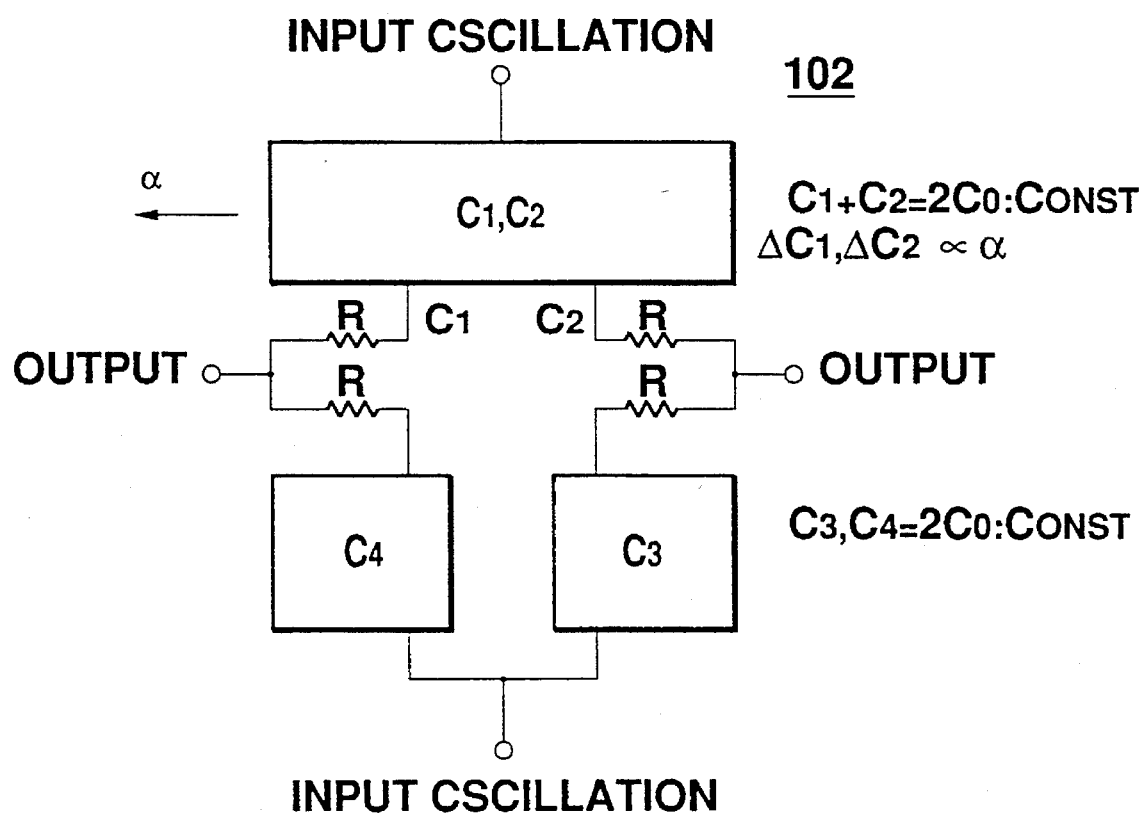
FIG. 15 is a plan view of an example of the layout of the MOS capacitors in the third and the fourth embodiments.

FIG. 15 shows an example of a layout pattern of these capacitors in this embodiment. As shown in FIG. 15, the bridge circuit 102 is obtained by connecting the capacitors C1, C2 shown in FIGS. 12 and 13 with the capacitors C3 and C4 shown in FIG. 14 through a resistors R of polysilicon Si or the like.

It is possible to produce each of the above-described embodiments with accuracy at a low cost by using a conventionally known MOS process. Since the structure is simple, these embodiments are easy to design and produce, which leads to a reduction in the cost.

FIGS. 16A to 16E show a method of producing the acceleration sensor 36 of the present invention, especially, the detecting portion while citing the capacitors C1 and C2 of the detecting portion 98 in the third embodiment as an example.

Figure 16A:
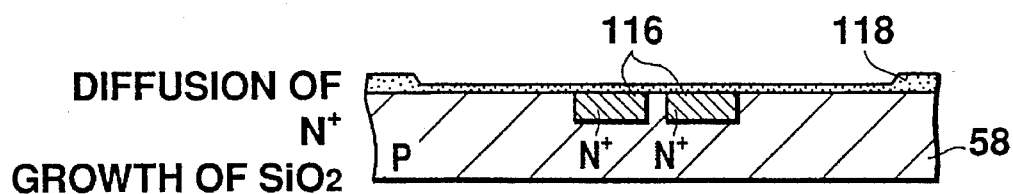

As shown in FIG. 16A, $N^+$ impurity is first diffused in the semiconductor substrate (P type Si substrate) 58 so as to form two $N^+$ diffusion layers 116. The $N^+$ diffusion layers 116 are used as the $N^+$ diffusion layers 106 and 108, which constitute the MOS capacitors C1 and C2, respectively when the detecting portion 98 is completed. After the diffusion process, the oxide layer at predetermined portions (including the vicinity of the $N^+$ diffusion layers 116) on the surface of the semiconductor substrate (P type Si substrate) 58 is removed, and an oxide layer ($SiO_2$ film) 118 of about 1000 angstrom thick is formed by thermal oxidization. The oxide layer ($SiO_2$ film).118 is used as the oxide layer 60 in the detecting portion 98.

Figure 16B:
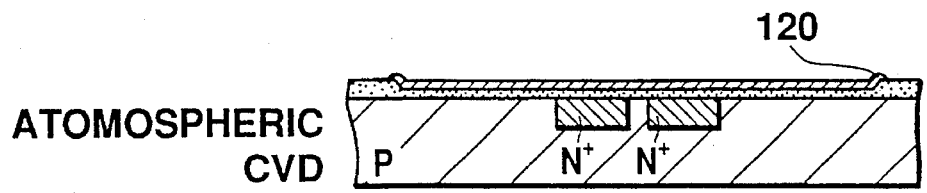
Figure 16C:
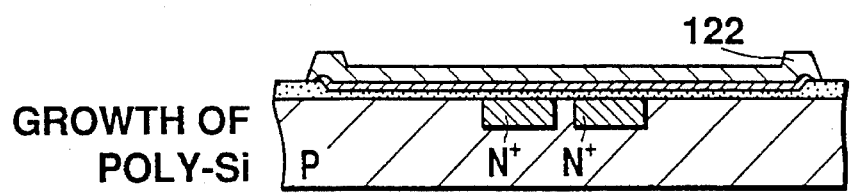
Figure 16D:
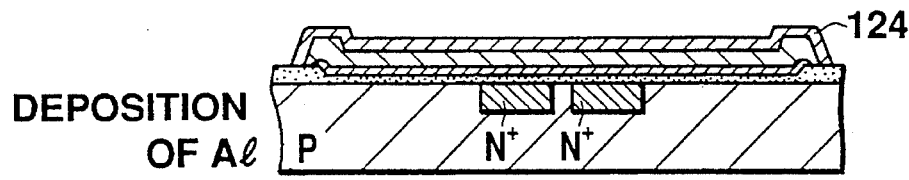

Thereafter, as shown in FIG. 16B, an atmospheric CVD (chemical vapor deposition) film 120 containing phosphorus with a high concentration is grown at a predetermined portion on the oxide layer ($SiO_2$ film) 118 to a thickness of about several thousand angstrom. A polysilicon Si film 122 is then grown to a thickness of about 5000 angstrom-several microns, as shown in FIG. 16C, and a predetermined pattern is formed by masking/etching. The polysilicon film 122 constitutes the weight and other members having a spring structure. Thereafter, as shown in FIG. 16D, an Al film 124 having a predetermined pattern is formed by masking/etching the polysilicon film 122. The Al film 124 is used as the electrode 104 in the detecting portion 98.

By hydrofluoric acid etching, the atmospheric CVD film 120 is removed while leaving the resist, and then the resist is peeled off.

Figure 16E:
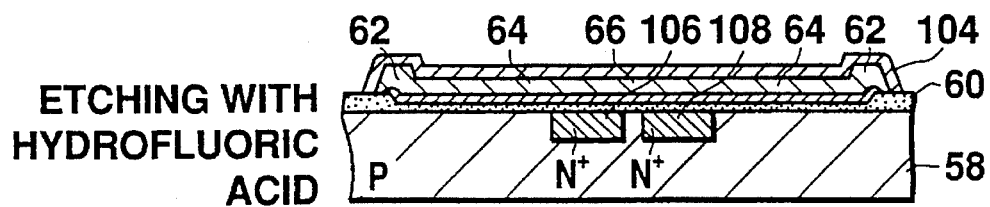

In this way, the detecting portion 98 in the third embodiment is obtained, as shown in FIG. 16E.

Figure 17:
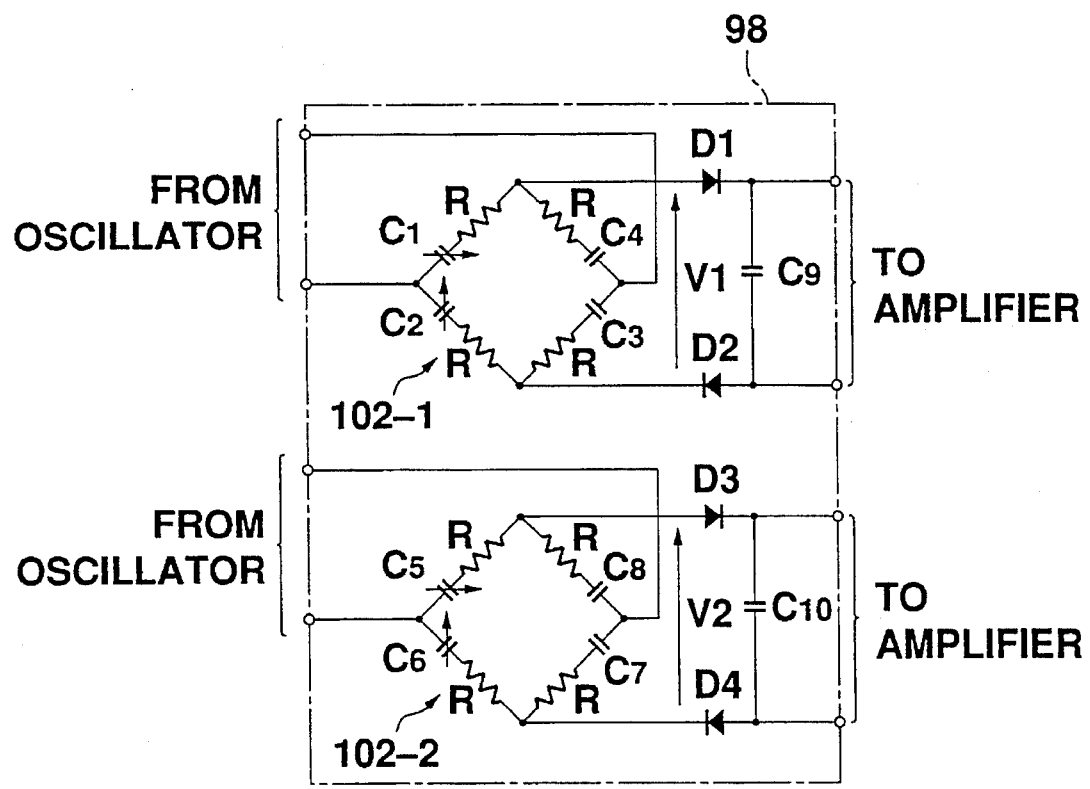
FIG. 17 is a circuit diagram of the detecting portion of the fourth embodiment.

FIG. 17 shows the structure of a fourth embodiment of an acceleration sensor of the present invention, especially, the detecting portion. In this embodiment, the circuit structure shown in FIG. 10 is utilized. This embodiment enables the two-dimensional detection of the acceleration by utilizing the structure of the third embodiment.

As shown in FIG. 17, the detecting portion 98 is provided with a pair of structures of the detection portion of the third embodiment shown in FIG. 11. The detecting portion 98 has bridge circuits 102-1 and 102-2 each side of which is an RC series circuit. The resistance of each side is constantly equally R, but the capacitances of capacitors C1, C2, C3, C4, C5, C6, C7 and C8 are equally $C_0$ only when the weight 66 is standing. The output of the oscillator 96 is input to each of the bridge circuits 102-1, 102-2, and the outputs of the bridge circuits 102-1, 102-2 are supplied to the amplifier 48 through the diodes D1, D2 and a capacitor C9, and through diodes D3, D4 and a capacitor C10, respectively.

Figure 18:
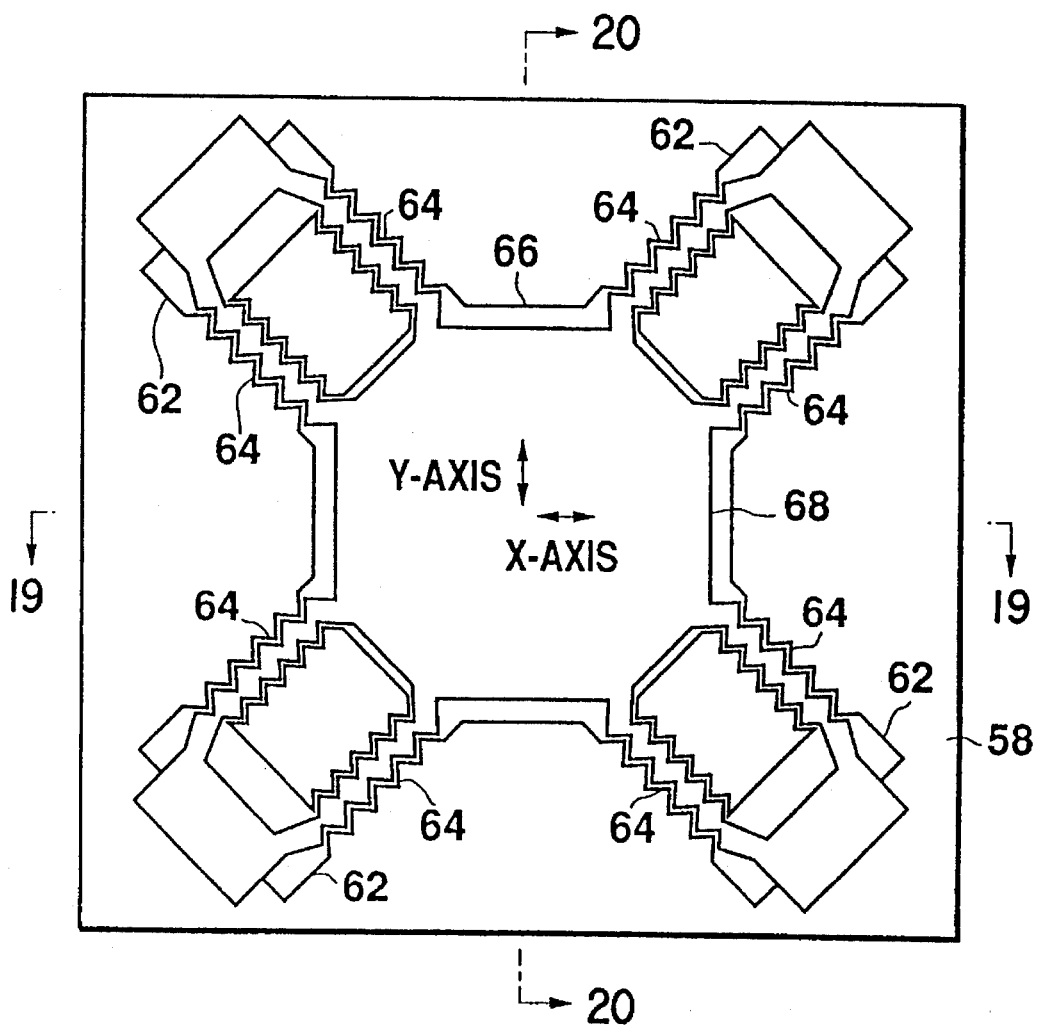
FIG. 18 is a plan view of the structure of the fourth embodiment.
Figure 19:
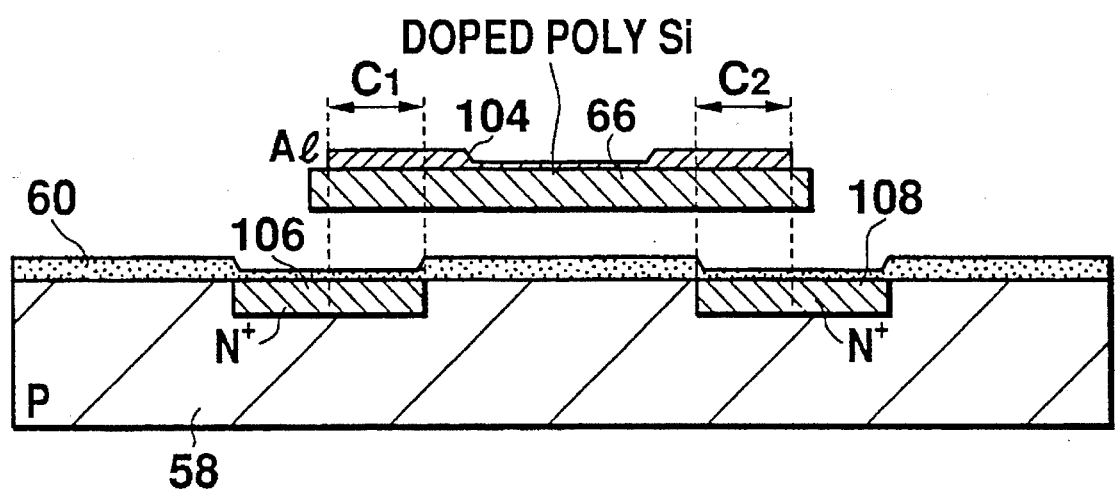
FIG. 19 is an end-face view of the capacitors C1 and C2 of the fourth embodiment shown in FIG. 18, taken along the line C—C.
Figure 20:
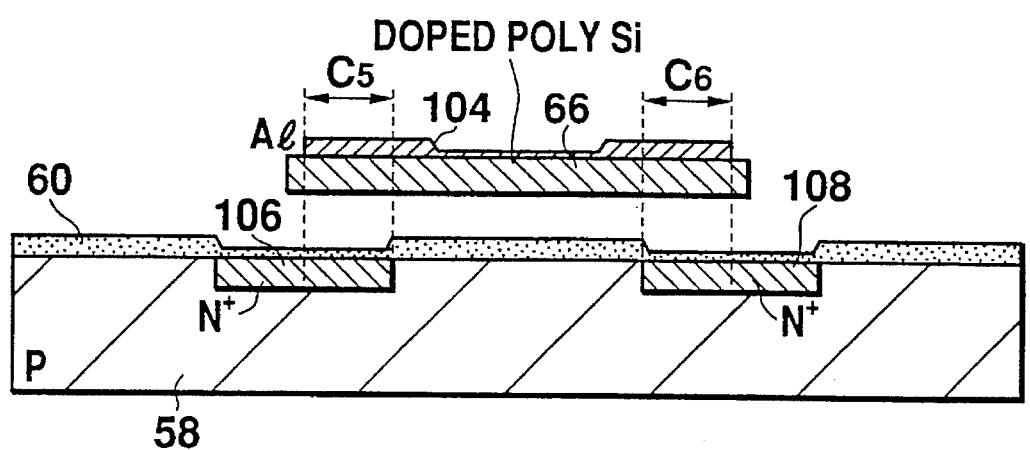
FIG. 20 is an end-face view of the capacitors C5 and C6 of the fourth embodiment shown in FIG. 18, taken along the line D—D.
Figures 21A, 21B:
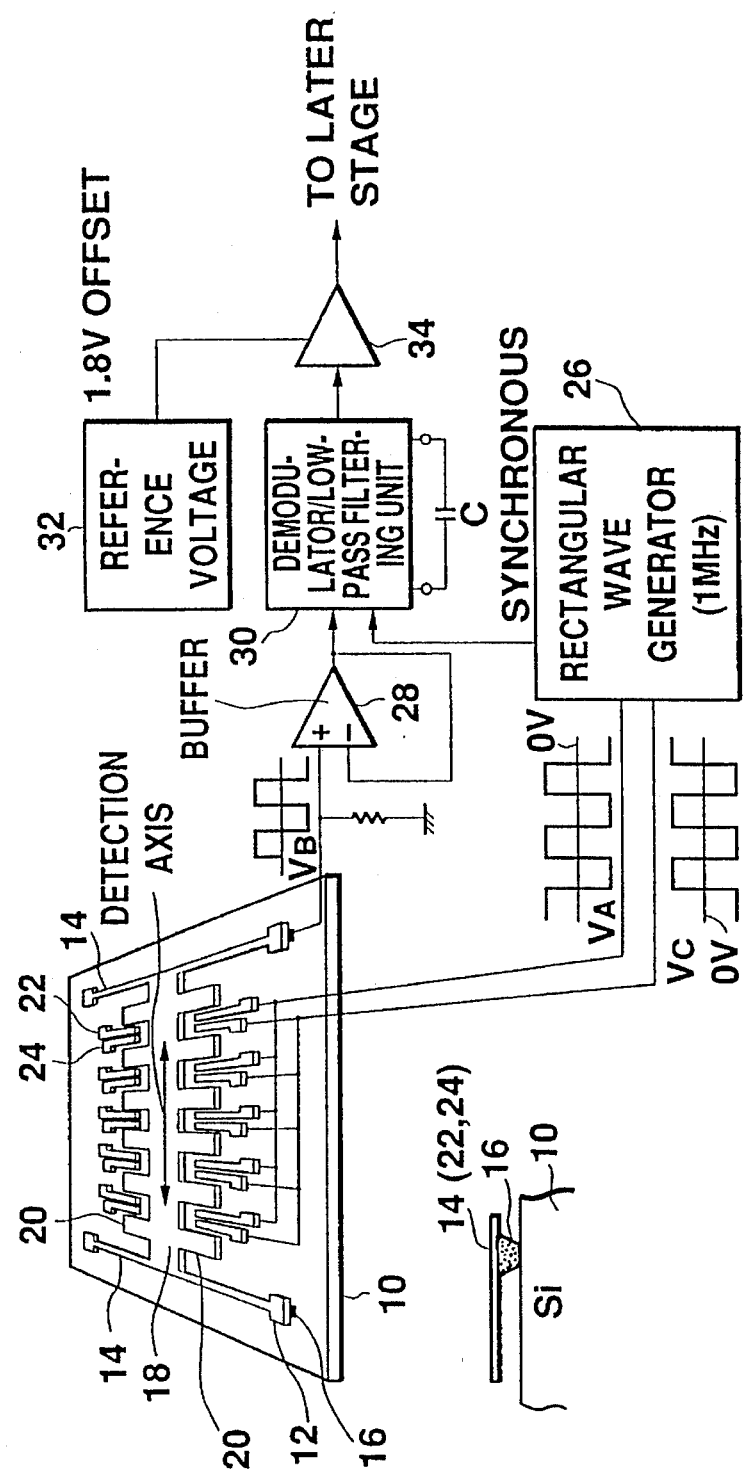
Figure 22:
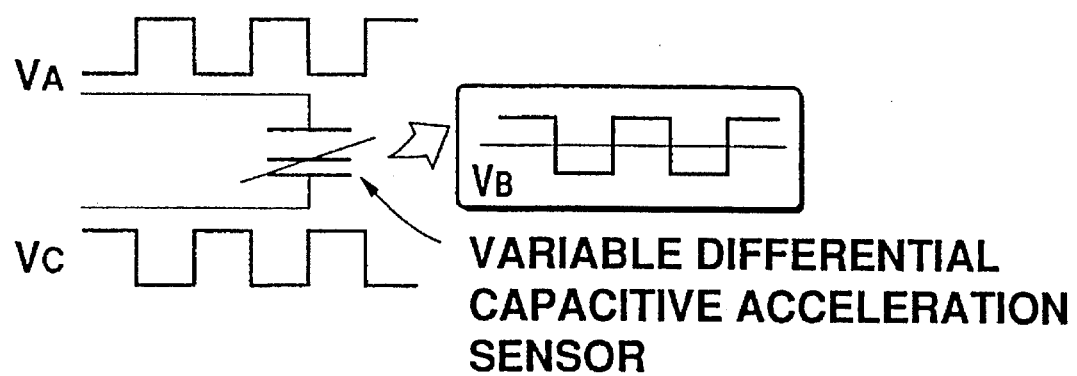
FIG. 22 shows the output waveform of the conventional acceleration sensor shown in FIG. 21A.

This embodiment is characterized in that while the capacitances of C3, C4, C7 and C8 are constantly $C_0$, the capacitors C1, C2, C5 and C6 are reciprocal variable capacitors like the capacitors C1 and C2 in the third embodiment. FIGS. 18 to 20 show the spring structure, namely, the structure of the capacitors C1, C2, C5 and C6 in this embodiment.

As shown in FIGS. 18 to 20, a bridge structure of polysilicon Si or the like is also formed in this embodiment. In this embodiment, a metal wiring 104 of Al or the like is formed on the column 64, and four $N^+$ diffusion layers are formed in the semiconductor substrate (P type Si substrate) 58. Two of the four $N^+$ diffusion layers are arranged in the direction of the x-axis and the other two are arranged in the direction of the y-axis, as shown in FIG. 19. These $N^+$ diffusion layers 106, 108 and the movable electrode 68 are opposed to each other, and they are arranged such that the MOS capacitance between the movable electrode 68 and the $N^+$ diffusion layer 106 is equal to the MOS capacitance between the movable electrode 68 and the $N^+$ diffusion layer 108 when the weight 66 is standing. These MOS capacitances in the direction of the x-axis are used as the capacitances of the capacitors C1 and C2, respectively, on the bridge circuit 102-1, and the MOS capacities in the direction of the y-axis are used as the capacitances of the capacitors C5 and C6, respectively, on the bridge circuit 102-2.

It is therefore understood that when the weight 66 is deflected in the direction of the x-axis by the acceleration, the values of the capacitors C1 and C2 reciprocally change, and that when the weight 66 is deflected in the direction of the y-axis, the values of the capacitors C5 and C6 reciprocally change. With the generation of such deflection, the balance of the bridge circuits 102-1 (102-2) is lost and an unbalance voltage is output from the detecting portion 98. The unbalance voltage linearly changes with respect to the deflection component of the weight 66 along the x-axis (y-axis) and, hence, the acceleration component along the axis.

In this way, according to this embodiment, it is possible to two-dimensionally detect the acceleration applied to the weight 66 by analyzing it into the components in the directions of X-axis and y-axis by applying the structure of the reciprocal variable capacitors in the third embodiment.

The capacitors C3, C4, C7 and C8 whose value are fixed can have a similar structure to that of the capacitors C3 and C4 in the third embodiment. This embodiment can be produced by applying the method shown in FIG. 16.

The present invention is not limited to a MOS structure but is applicable to a MIS structure in general. However, when an Si substrate is used as the semiconductor substrate 58, a MOS structure is preferable. In the case of using a compound semiconductor, a MIS structure with a nitride layer as "I" layer may be used, but it is preferable from the point of view of cost to adopt a MOS structure by using an Si substrate as the semiconductor substrate 58.

As explained above, according to the present invention, since a MIS (metal insulator semiconductor) structure is formed by a semiconductor substrate, an insulation film and a weight formed On the semiconductor substrate and an electrode formed on the surface of the weight, or a semiconductor substrate, an insulation film formed on the semiconductor substrate, an electrode which is brought into contact with/isolated from the weight formed on the insulation film with the deflection of the weight, and the deflection of the weight is converted into a linear output by the MIS structure, it is possible to obtain an output having a linear reproducibility with respect to the acceleration. If the MIS structure is a MIS transistor array, for example, it is possible to detect the acceleration linearly from the position of an MIS transistor which is on/off. If the MIS structure is a plurality of variable MIS capacitors, it is possible to detect the acceleration linearly from an unbalance voltage of a bridge circuit. In addition, since it is not necessary to use a weight in the shape of ribs, the detection range is enlarged.

According to the present invention, the deflection of the weight is stably detectable and the sensitivity is improved due to the MIS structure. That is, it is possible to detect the deflection of the weight stably with a higher sensitivity by detecting the on/off of each MIS transistor when the MIS structure is a MIS transistor array, and by detecting the capacitance between the plane capacitors when the MIS structure is a bridge circuit composed of MIS capacitors. If a plurality of MIS structures are arranged at a predetermined angle, it is possible to detect the acceleration two-dimensionally.

Furthermore, since it is possible to produce an acceleration sensor of the present invention by applying a MIS process which is conventionally known, a simplified structure is formed on a semiconductor substrate with a high accuracy, and an acceleration sensor which is stable with time and which is applicable to a safety apparatus for a vehicle is obtained at a low cost.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An acceleration sensor having a semiconductor substrate, comprising:

a bridge structure formed on said semiconductor substrate, said bridge structure including:

a weight having a predetermined mass; and a direction regulating member for regulating the direction of deflection of said weight which is produced when an acceleration is applied thereto, to a predetermined direction which is approximately parallel to a surface of said semiconductor substrate; and a plurality of metal-insulator-semiconductor type elements which are formed in said semiconductor substrate in the direction of deflection of said weight, an output of each of said metal-insulator-semiconductor type elements being controlled by the deflection of said weight.

2. An acceleration sensor according to claim 1, wherein said plurality of metal-insulator-semiconductor type elements are metal-insulator-semiconductor type transistors formed in said semiconductor substrate such that each of said transistors is turned on or off when said weight comes close thereto.

3. An acceleration sensor according to claim 2, wherein said plurality of metal-insulator-semiconductor type elements are arranged at regular pitches.

4. An acceleration sensor having a semiconductor substrate, comprising:

a bridge structure formed on said semiconductor substrate, said bridge structure including:

a weight having a predetermined mass; and a direction regulating member for regulating the direction of deflection of said weight which is produced when an acceleration is applied thereto, to a predetermined direction which is approximately parallel to a surface of said semiconductor substrate;

a plurality of metal-insulator-semiconductor type elements which are formed in said semiconductor substrate in the direction of deflection of said weight, an output of each of said metal-insulator-semiconductor type elements being controlled by the deflection of said weight;

wherein said plurality of metal-insulator-semiconductor type elements are metal-insulator-semiconductor type transistors formed in said semiconductor substrate such that each of said transistors is turned on or off when said weight comes close thereto; and wherein said metal-insulator-semiconductor type transistors include:

a metal electrode which is deflected with the deflection of said weight, an insulation film formed on a surface of said semiconductor substrate;

a plurality of source layers formed for the respective metal-insulator-semiconductor type transistors in said semiconductor substrate; and a drain layer formed in said semiconductor substrate;

each of said source layers and said drain layer being arranged with a space therebetween so that a channel is formed in said space and said channel is opposed to said metal electrode through said insulation film when said metal electrode comes close to said channel.

5. An acceleration sensor according to claim 4, wherein said metal electrode is an aluminum electrode and said insulation film is an oxide film.

6. An acceleration sensor according to claim 4, wherein said plurality of metal-insulator-semiconductor type transistors hold said drain layer in common.

7. An acceleration sensor according to claim 6, wherein said plurality of metal-insulator-semiconductor type transistors are arranged in two rows with said common drain layer therebetween.

8. An acceleration sensor having a semiconductor substrate, comprising:

a bridge structure formed on said semiconductor substrate, said bridge structure including:

a weight having a predetermined mass; and a direction regulating member for regulating the direction of deflection of said weight which is produced when an acceleration is applied thereto, to a predetermined direction which is approximately parallel to a surface of said semiconductor substrate;

a plurality of metal-insulator-semiconductor type elements which are formed in said semiconductor substrate in the direction of deflection of said weight, an output of each of said metal-insulator-semiconductor type elements being controlled by the deflection of said weight;

wherein said plurality of metal-insulator-semiconductor type elements are metal-insulator-semiconductor type transistors formed in said semiconductor substrate such that each of said transistors is turned on or off when said weight comes close thereto; and wherein said metal-insulator-semiconductor type transistors include:

an insulation film formed on a surface of said semiconductor substrate;

a plurality of source layers formed for the respective metal-insulator-semiconductor type transistors in said semiconductor substrate; and a drain layer formed in said semiconductor substrate;

first metal electrodes formed on said insulation film; and a second metal electrode which is deflected with the deflection of said weight, each of said source layers and said drain layer being arranged with a space therebetween so that a channel is formed in said space and said channel is opposed to the corresponding first metal electrode through said insulation film.

9. An acceleration sensor having a semiconductor substrate, comprising:

a bridge structure formed on said semiconductor substrate, said bridge structure including:

a weight having a predetermined mass;

a direction regulating member for regulating the direction of deflection of said weight which is produced when an acceleration is applied thereto, to a predetermined direction which is approximately parallel to a surface of said semiconductor substrate; and a plurality of metal-insulator-semiconductor type elements which are formed in said semiconductor substrate in the direction of deflection of said weight, an output of each of said metal-insulator-semiconductor type elements being controlled by the deflection of said weight; and wherein said plurality of metal-insulator-semiconductor type elements are metal-insulator-semiconductor type capacitors.

10. An acceleration sensor according to claim 9, wherein said plurality of metal-insulator-semiconductor type capacitors include:

an insulation film formed on a surface of said semiconductor substrate;

a plurality of high density impurity layers formed for the respective metal-insulator-semiconductor type capacitors in said semiconductor substrate; and a metal electrode which is deflected with the deflection of said weight.

11. An acceleration sensor according to claim 9, further comprising a bridge circuit which includes said plurality of metal-insulator-semiconductor type elements on sides of said bridge circuit.

12. An acceleration sensor, having a semiconductor substrate, comprising:

a bridge structure formed on said semiconductor substrate, said bridge structure including:

a weight having a predetermined mass; and a direction regulating member for regulating the direction of deflection of said weight which is produced when an acceleration is applied thereto, to a predetermined direction which is approximately parallel to a surface of said semiconductor substrate; and a plurality of metal-insulator-semiconductor type elements which are formed in said semiconductor substrate in the direction of deflection of said weight, an output of each of said metal-insulator-semiconductor type elements being controlled by the deflection of said weight;

wherein said direction regulating member includes a plurality of columns each of which has elasticity in the direction approximately parallel to a surface of said semiconductor substrate; said plurality of columns being arranged in said direction of deflection of said weight to be regulated, with one end of each column fixed to said semiconductor substrate and the other end connected to said weight.

13. An acceleration sensor according to claim 12, wherein said plurality of columns and said weight are integrally formed.

14. An acceleration sensor according to claim 12, wherein said plurality of columns and said weight are composed of polysilicon.

15. An acceleration sensor according to claim 12, wherein each of said columns has a bent portion which is bent in a plane approximately parallel to said semiconductor substrate.

16. An acceleration sensor having a semiconductor substrate, comprising:

a bridge structure formed on said semiconductor substrate, said bridge structure including:

a weight having a predetermined mass;

a direction regulating member for regulating the direction of deflection of said weight which is produced when an acceleration is applied thereto, to a predetermined direction which is approximately parallel to a surface of said semiconductor substrate; and a plurality of metal-insulator-semiconductor type elements which are formed in said semiconductor substrate in the direction of deflection of said weight, an output of each of said metal-insulator-semiconductor type elements being controlled by the deflection of said weight; and wherein said direction regulating member includes a plurality of columns each of which has elasticity in the direction approximately parallel to a surface of said semiconductor substrate; said plurality of columns being arranged in two directions each of which is the direction of deflection of said weight is to be regulated and the two direction crossing a predetermined angle, with one end of each column fixed to said semiconductor substrate and the other end connected to said weight.

17. An acceleration detecting method comprising the steps of:

regulating a direction of deflection of a weight having a predetermined mass to a predetermined direction which is approximately parallel to a surface of a semiconductor substrate by a direction regulating member which is formed on said semiconductor substrate; and monitoring outputs of a plurality of metal-insulator-semiconductor type elements which are formed in the semiconductor substrate in the direction of deflection of said weight, and detecting said acceleration in said predetermined direction which is applied to said weight by a predetermined processing of the outputs of said metal-insulator-semiconductor type elements.

18. A vehicle safety apparatus comprising:

a safety mechanism;

an acceleration sensor including;

a bridge structure formed on semiconductor substrate, said bridge structure being provided with:

a weight having a predetermined mass; and a direction regulating member which is produced when an acceleration is applied, to a predetermined direction which is approximately parallel to a surface of said semiconductor substrate; and a plurality of metal-insulator-semiconductor type elements which are formed in said semiconductor substrate in the direction of deflection of said weight, the output of each of said metal-insulator-semiconductor type elements being controlled by the deflection of said weight; and a means for operating said safety mechanism in accordance with an output of said acceleration sensor.

19. A vehicle safety apparatus according to claim 18, wherein said safety mechanism is an air bag.

* * * * *